Nov. 5, 1957 F. TRINCA 2,812,000
VALVE EXTENSION AND WHEEL COVER LOCK
Filed July 3, 1956 2 Sheets-Sheet 1

INVENTOR.
FREDERICK TRINCA
BY
Albert J. Kramer
ATTORNEY

Nov. 5, 1957 F. TRINCA 2,812,000
VALVE EXTENSION AND WHEEL COVER LOCK
Filed July 3, 1956 2 Sheets-Sheet 2

INVENTOR.
FREDERICK TRINCA
BY
Albert J. Kramer
ATTORNEY

United States Patent Office 2,812,000
Patented Nov. 5, 1957

2,812,000

VALVE EXTENSION AND WHEEL COVER LOCK

Frederick Trinca, Rego Park, N. Y.

Application July 3, 1956, Serial No. 595,674

6 Claims. (Cl. 152—427)

This invention relates to locking devices and it is more particularly concerned with means for protecting against the loss of automobile wheels and parts thereof from theft and also from mechanical reasons.

One of the objects of this invention is the provision of a locking device for application to the protruding outer end or nipple of a valve body of an automobile wheel and tire equipped with the usual cover plate, which is effective to hold the cover plate in position and to protect it against removal by unauthorized persons, thereupon also serving to protect the entire wheel itself against unauthorized removal, because the cover plate, as in most cases provided, must be removed before the wheel can be taken off.

Another object of this invention is the provision of a locking device for an automobile wheel cover plate which is effective to prevent or minimize shifting of the cover plate relative to the wheel under forces usually encountered by the wheel, such as bumps, vibrations, jarrings, tortional accelerations, etc.

A further object of the invention is the provision of such a lock device which obviates the need for the ordinary valve dust cap.

A still further object of the invention is the provision of an extension device for the externally threaded nipple of a tire valve body to facilitate inflating and deflating the tire.

A still further object of the invention is the provision of such a lock device which is capable of being provided with a variety of unique key combinations so as to render each device distinctive of others like it in the locking and unlocking mechanism.

These and other objects and advantages of the invention will be apparent from the following description considered together with the accompanying drawing.

Figure 2:
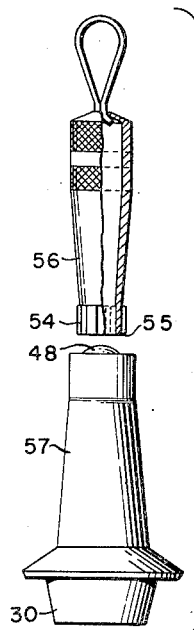
Fig. 2 is an elevational view of the embodment, including the key member, apart from the automobile wheel, on a somewhat larger scale.

Referring with more particularity to the drawing in which like numerals designate like parts, the embodiment is shown in conjunction with an automobile tire valve 11 of the conventional type connected to a pneumatic tube 12 inside a tire 13 carried on the channeled rim 14 of a wheel 15 of the automobile, said wheel including the usual wheel body 16, brake drum 17, and back plate 18. The invention may be used with tubeless tires, as well as with combined tires and tubes.

The wheel body structure as shown includes a detachable hub cap or outer cover plate 19 which is usually provided with a resiliently yieldable marginal portion 20 for snap engagement with an edge portion or ridge 21 on the outside of the channeled rim 14.

The valve 11 comprises the usual nipple stem 22 which projects outwardly through an aperture 23 in the rim 14. The stem 22 customarily has an outward threaded end portion 24 and a frustro-conical rubber casing 25, the latter being integral with the tube 12.

The stem 22 contains the mechanism of the valve which includes a longitudinally movable spring biased valve stem 26, well known to the art. In the outermost position of the stem 26, the valve is closed and when inwardly depressed, the valve is open to admit air to or release it from the interior of the tire.

The device of the present invention comprises a hollow body member 27 having an outer cylindrical end portion 28, a tapered intermediate portion 29 and a tapered inner end or collar 30 with an enlarged opening 31 to admit and tightly wedge against a portion of the rubber casing 25. This collar 30 also carries a circular flange 32, the purpose of which will be explained more fully hereinafter.

The intermediate portion 29 has internal threads 33 for engaging the threads of the end portion 24.

A section above the internal threads 33 has a restricted cylindrical wall 34, and the inner bore 35 of the portion 28 is further restricted above the wall 34 to form a downwardly facing shoulder 36.

The wall section 34 carries a hollow cylindrical insert transverse bracket member 37 which is welded, soldered or otherwise secured in position. The member 37 has an upper end wall 38 which supports the lower end of a coil spring 39. A boss 40 projects upwardly from the wall 38 into the coil spring to act as a retainer for the spring.

The member 37 also has a dependent cylindrical portion 41 which projects from the bottom and forms with the upper end of the threaded portion 33 an annular space for receiving a rubber ring 42 which abuts and forms an air tight seal with the upper end of the stem 22.

The interior wall 43 of the member 37 is cylindrical and it is a guide for an axially slidable plug 44 loosely disposed therein to permit the passage of air therebetween. The plug 44 is carried on the lower end of a pin rod 45 and the rod projects upwardly through an enlarged aperture 46 in the upper end wall 38 and boss 40. The aperture 46 is enlarged to permit the passage of air between it and the rod 45. A rubber seal member 47 is disposed at the upper end of the plug 44 around the rod 45, as shown, to normally contact and seal the lower end of the aperture 46.

The rod 45 extends axially upward to the top of the body member 27 and on its upper end slidably carries a circular end wall or dome 48. The rod 45 passes through a central aperture 49 of the dome 48 and the upper end 50 is flared to seat against an upper countersunk portion 51 of the aperture 49.

The upper end of the coil spring 39 seats against the bottom of the member 48 around a recessed portion 52 and hence constantly urges the member 48 upwardly together with the rod 45.

The inner wall portion of the upper section 28 adjacent the outer end is provided with an exclusive pattern 53 of grooves and ridges to match or mesh with a corresponding reverse pattern of ridges and grooves 54 of an end portion 55 of a hollow cylindrical key member 56. The exclusiveness of the pattern may be developed by varying the number of ridges, the size of the ridges, including the relative sizes of ridges of a given pattern, the diameters of the walls, and/or combinations of two or more of these variants.

The pattern may be exclusive for a set of, say, 4 or 5 of the devices, so as to require only one key member for the wheels of a given automobile. The periphery of the member 48 may also be grooved, as shown.

A shell 57 extends around the exterior surfaces of the upper and intermediate portions of the body member and around the flanged portion 32. The lower end 58 of the shell is turned in to lie against a portion of the bottom shoulder 59 of said flanged portion. The shell 57 is freely rotatable, thereby making it impossible to rotate the body member by merely turning the shell. Consequently, the only way the body member can be placed on and removed from the nipple 22 is by the use of a proper corresponding key member 56.

When a proper key member is inserted, it depresses the end wall 48 relative to the rod 45 against the action of the spring 39. The end portion 55 of the key member then engages the pattern 53 of the upper wall of the portion 28 which permits rotating the body 27 and hence engaging or disengaging it with the nipple threads 24.

Figure 1:
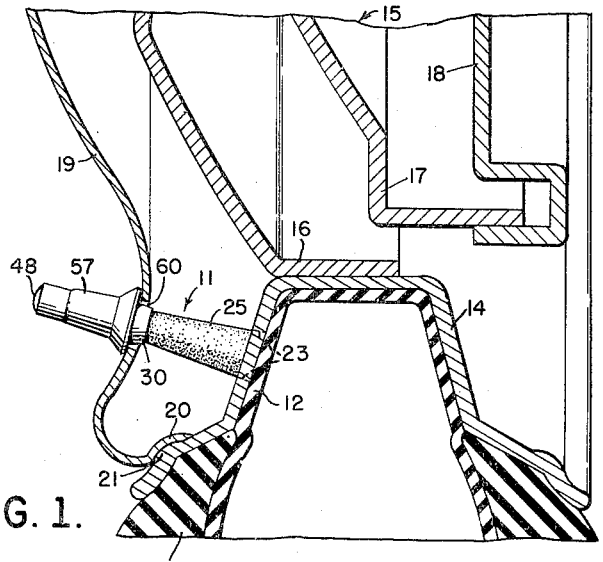
Fig. 1 is a cross sectional view through a portion of a typical automobile wheel and its cover plate showing the application thereto of an embodiment of this invention.
Figure 3:
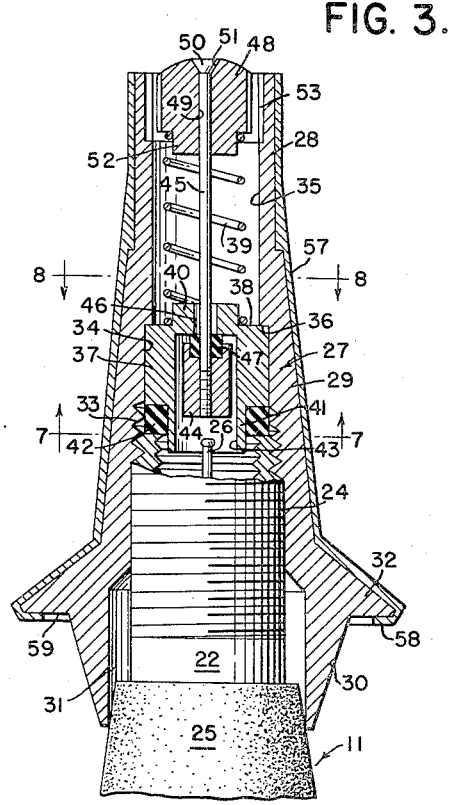
Fig. 3 is a vertical sectional view of the embodiment on a still larger scale in position on an ordinary tire wheel.
Figure 4:
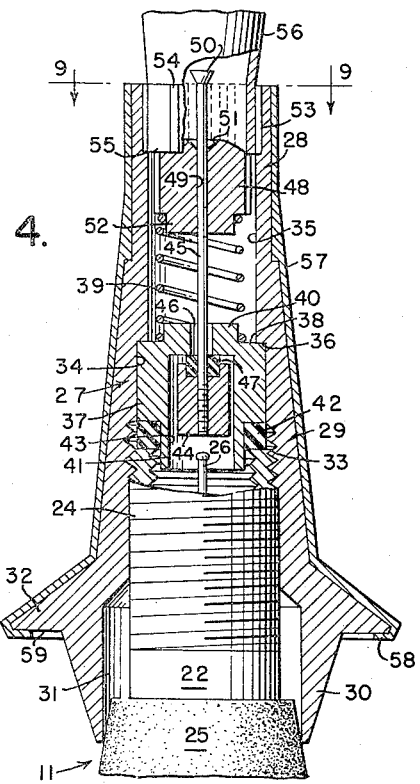
Fig. 4 is a view similar to Fig. 3 with the key member applied in operative position.
Figure 6:
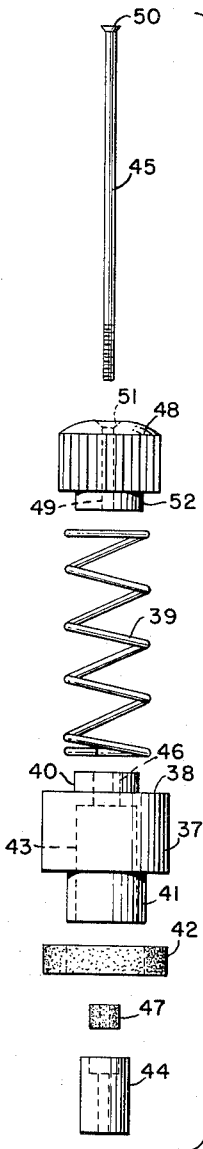
Fig. 6 is an exploded view of the inner parts of the embodiment.
Figure 7:
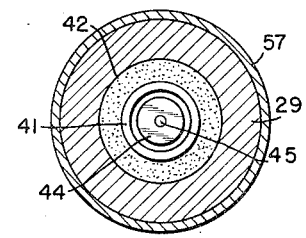
Fig. 7 is a plan section along the line 7—7 of Fig. 3.
Figure 8:
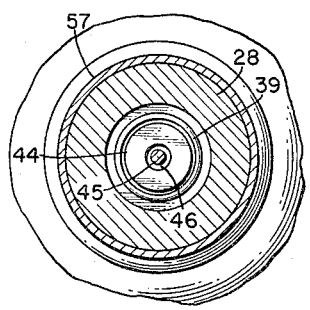
Fig. 8 is a plan section along the line 8—8 of Fig. 3.

When properly engaged with the nipple threads, the collar 30 enters the aperture 60 of the wheel cover 19 through which the nipple normally projects, and the bottom of the flange 32 is adjacent the wheel cover, as shown in Fig. 1.

When it is desired to inflate the tire, the air hose (not shown) is placed against the upper end of the device just as it is done with an ordinary valve nipple. The pressure of the air depresses the rod 45 and end wall 48 which establishes a passageway for the air to the air valve in the stem 22. When the pressure is released, the rod 45 is returned to its normal upper position, whereupon the engagement of the rubber ring 47 against the bottom of the aperture 46 acts to seal exterior dust particles from the valve. This makes it unnecessary to provide the usual dust cap.

Figure 5:
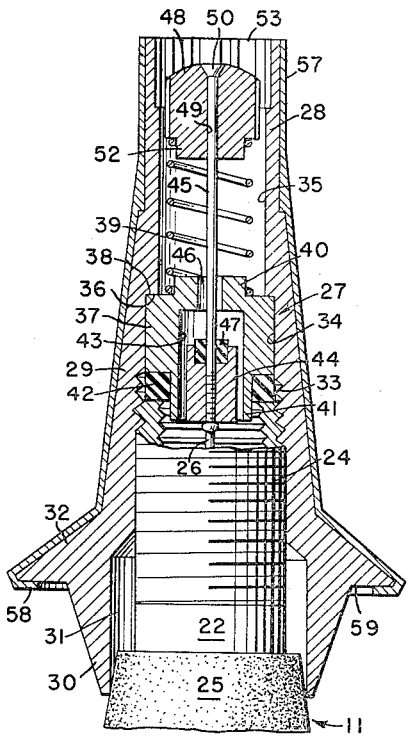
Fig. 5 is a view similar to Fig. 3 and 4 with the movable parts of the device in position to open the valve for admitting air to or releasing air from the tire.
Figure 10:
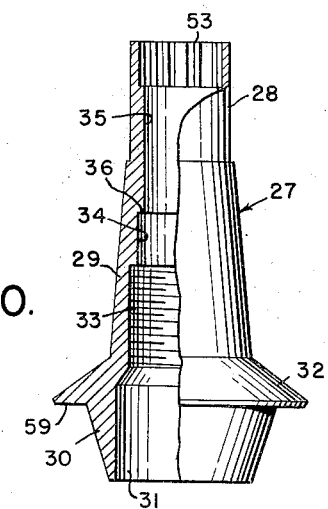
Fig. 10 is an elevational view, partly cut away, of the main body portion alone of the embodiment.
Figure 9:
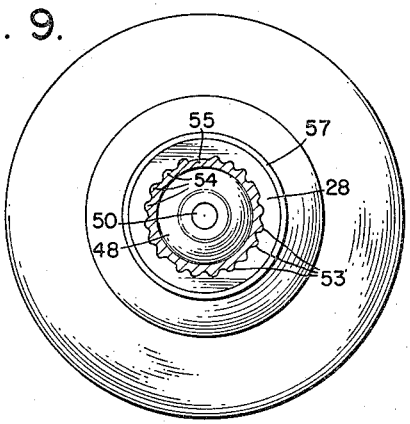
Fig. 9 is a plan section along the line 9—9 of Fig. 4.

Should it be desired to deflate the tire, or release some of the air therein, the rod 45 is simply depressed. This causes the plug 44 to bear against the valve pin 26 and, in turn, depresses it to open the valve, as shown in Fig. 5.

Wholly apart from its locking features, the device is also useful as an extension of the tire valve to facilitate inflating and deflating the tire, particularly in the fact that it obviates the need for using the conventional removable dust cap which is bothersome and easy to lose.

Having thus described my invention, I claim:

1. An extension device for application to the externally threaded nipple of a tire valve body comprising a hollow tubular member having an internally threaded portion for engaging the external threads, a rod axially disposed within the tubular member between the internally threaded portion and the other end of the valve body, a transverse bracket member supporting said rod for axial movement in the tubular member, a movable member having a circular end wall slidably mounted on and relative to the rod, resiliently yieldable means between said movable member and transverse bracket member, and abutment means for limiting the movement of the movable member relative to the rod under the action of the resiliently yieldable means.

2. A device as defined by claim 1 and air sealing means between the rod and bracket.

3. An extension and automobile wheel cover plate locking device for application to the externally threaded nipple of a tire valve body projecting through an aperture in said plate, said device comprising a hollow tubular member having a tapered portion at one end for engaging the rim of said aperture, and an internally threaded portion for engaging the external threads of the valve body, a rod axially disposed within the tubular member between the internally threaded portion and the other end of the valve body, a transverse bracket member supporting said rod for axial movement in the tubular member, a movable member having a circular end wall slidably mounted on and relative to the rod, resiliently yieldable means between said movable member and bracket member, abutment means for limiting the movement of the movable member relative to the rod under the action of the resiliently yieldable means, air sealing means between the rod and bracket member, and a shell encompassing and rotatably mounted on the exposed lateral surfaces of the tubular member.

4. A device as defined by claim 3 in which the shell and tubular member are interlocked to prevent relative axial displacement.

5. A device as defined by claim 3 in which a portion of the internal wall of the tubular member adjacent the movable end wall has a pattern of ridges and channels to engage a key member.

6. A device as defined by claim 3 in which a portion of the internal wall of the tubular member adjacent the movable member has a pattern of ridges and channels, and a key member having a cylindrical portion with a correspondingly reversed pattern of ridges and channels.

References Cited in the file of this patent

UNITED STATES PATENTS

| | | |
|---|---|---|
| 2,043,380 | Kirkpatrick | June 9, 1936 |
| 2,233,173 | McCoy | Feb. 25, 1941 |
| 2,747,940 | Tracy | May 29, 1956 |